May 31, 1960   E. S. TUPPER   2,938,267
COMBINED KITCHEN UTENSIL
Filed Nov. 10, 1954   2 Sheets-Sheet 1
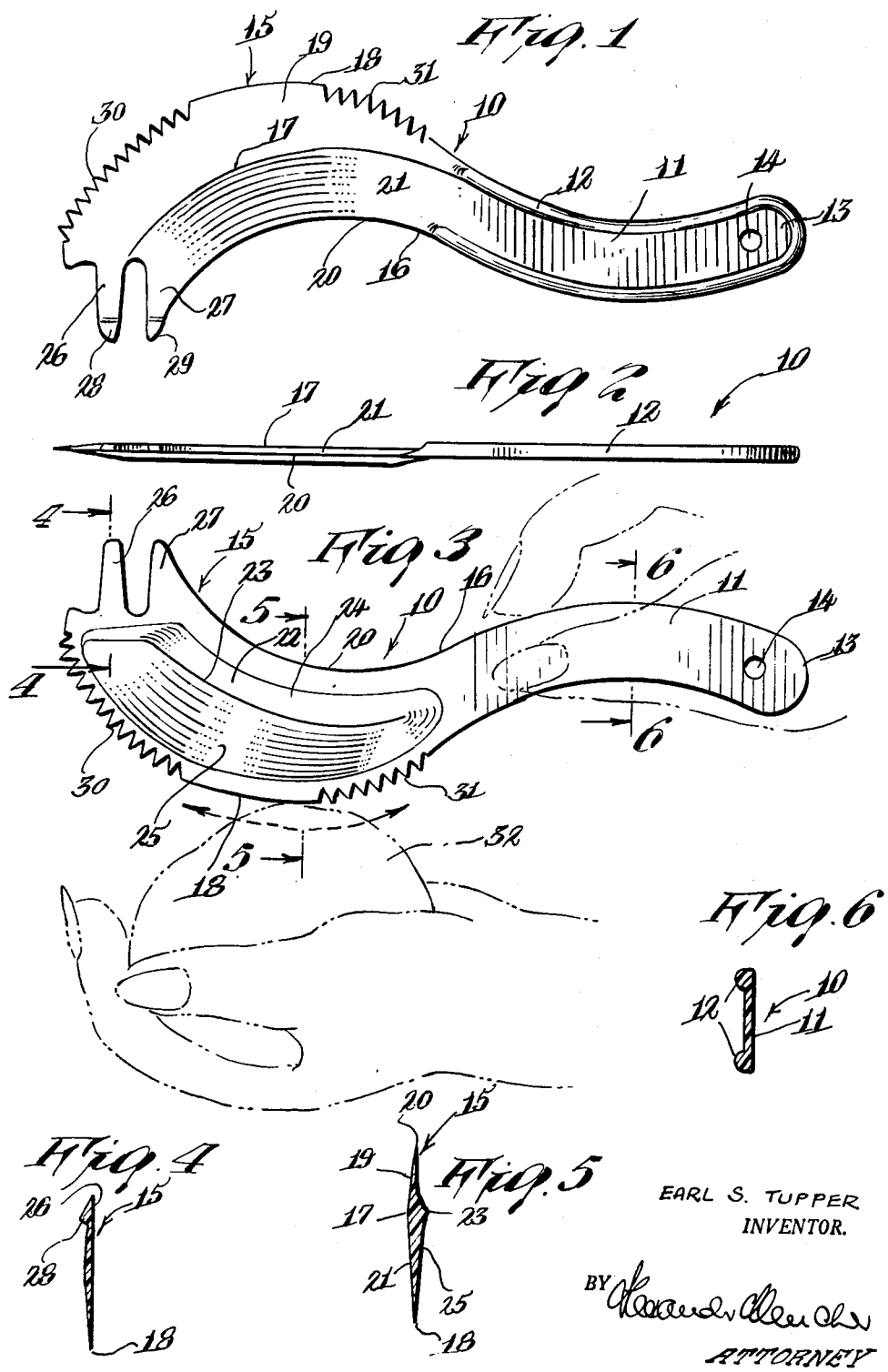
EARL S. TUPPER
INVENTOR.

May 31, 1960 — E. S. TUPPER — 2,938,267
COMBINED KITCHEN UTENSIL
Filed Nov. 10, 1954 — 2 Sheets-Sheet 2
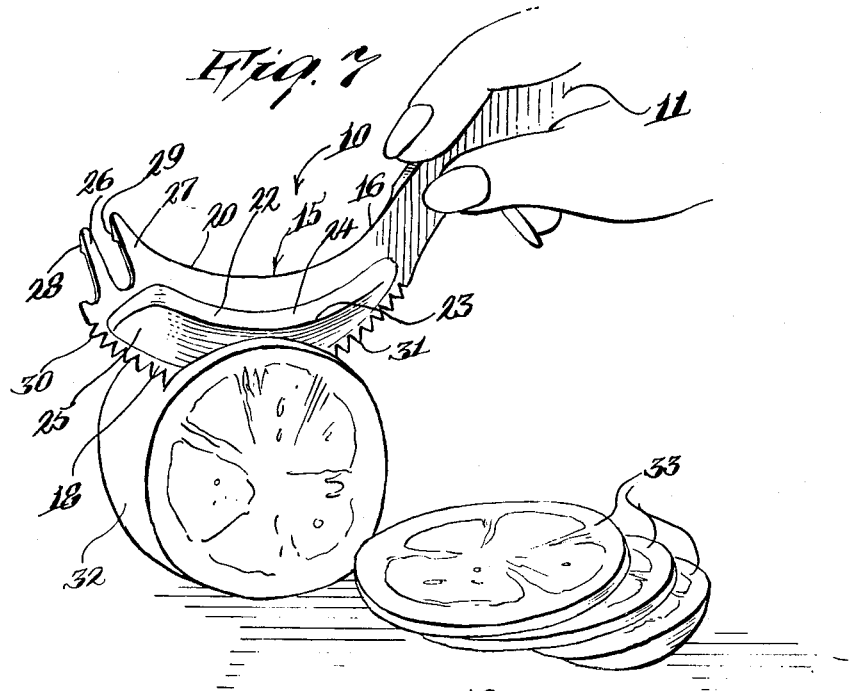
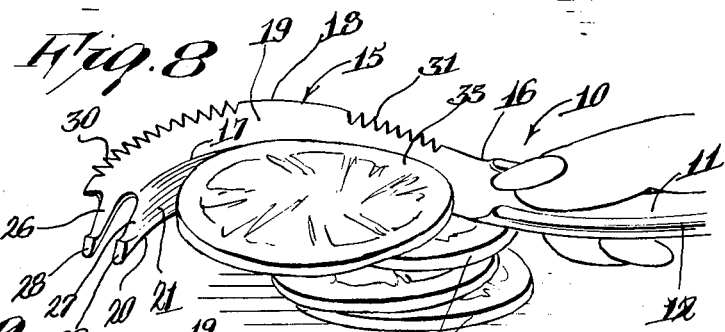
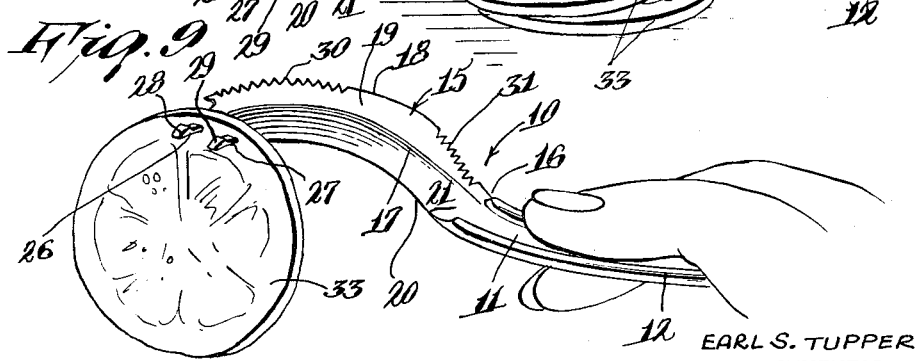
EARL S. TUPPER
INVENTOR.
BY *[signature]*
ATTORNEY United States Patent Office 2,938,267
Patented May 31, 1960

2,938,267
COMBINED KITCHEN UTENSIL

Earl S. Tupper, Upton, Mass., assignor to Tupper Corporation, North Smithfield, R.I., a corporation of Delaware Filed Nov. 10, 1954, Ser. No. 467,993

1 Claim. (30—142)

This invention relates generally to an all-purpose kitchen utensil, but more particularly to a combination slicer, saw, fork and server.

The main object of the invention resides in the provision of a kitchen utensil which combines the functions of a slicer, saw, fork and server and wherein each of the functions are correlated in the design of a single device.

Another object of the invention resides in the provision of a device of this kind which embraces edge structures of a knife, a saw and a fork all having a common handle and which also embraces a serving surface.

A still further object of the invention resides in the provision of a kitchen utensil which is formed of an inert and odorless plastic material in one piece by any of the known molding methods, and which is sanitary, safe, durable and occupies a minimum of space.

Another object of the invention resides in the provision of a device of this kind adapted to be used both for the kitchen and for the serving table, and which is therapeutically pleasant in appearance, light in weight and efficient in operation.

These objects and other incidental ends and advantages of the invention will hereinafter appear in the progress of the disclosure and as set forth in the appended claims.

Accompanying this specification are drawings wherein:

Figure 1 is a top plan view of a preferred embodiment of the invention;

Figure 2 is a front elevational view thereof;

Figure 3 is a bottom plan view thereof;

Figure 4 is a transverse sectional view taken along the plane 4—4 of Figure 3;

Figure 5 is a transverse sectional view thereof taken along the plane 5—5 of Figure 3;

Figure 6 is a transverse sectional view thereof taken along the plane 6—6 of Figure 3;

Figure 7 is a perspective view showing the device in operative use as a combination saw and knife for cutting soft vegetables, such as tomatoes;

Figure 8 is a perspective view showing the device in operative use as a serving knife; and Figure 9 is a perspective view showing the device in operative use as a fork.

In accordance with the invention and the preferred form shown, numeral 10 indicates generally a combination slicer, saw, fork and server, preferably formed by molding plastic material and having such properties as hardness, relative inflexibility, chemical inertness, being odorless, having lightness and being capable of being attractively colored. Polystyrene has been found to be one of the suitable materials from which the device is made. The device includes a handle 11 at one end which is in the form of an axially curved member provided on its upper face with a peripheral bead 12 extending around the rounded end 13 and in which an opening 14 is provided to hang the utensil when not in use. The handle 11 is provided with any desired curvature for comfort to hand fitting, the side edges thereof continuing into the formation of an oppositely curved operating end generally indicated by numeral 15. The operating end is wider at its outer portion and narrows at its inner portion, as at 16, for tangential connection with the handle portion 11, the bead 12 terminating at the juncture. The bead 12 reinforces the handle 11, which latter may as a result be of thinner material than would otherwise be the case to provide a device of decreased weight and cost.

The upper face of the operating end 15 tapers downwardly and outwardly in opposite directions from an intermediate curved high point 17 (Figures 1 and 5) and is reduced in thickness along its sharp upper edge 18 by the surface 19 and along its lower edge 20 by the surface 21.

The reverse face of the handle 11 and operating end 15 is flat (Figure 3) save for a curved ridge 22 having a high point 23 which tapers into the plane of the operating end along the opposite surfaces 24 and 25, the taper of the surface 25 being more gradual than that of the surface 24 (Figure 5).

The end of the operating end 15 is integrally formed with the laterally extending fork elements 26 and 27, longitudinally spaced apart and integrally formed on their upper faces with the tapered thickened end portions 28 and 29, respectively.

The curved cutting edge 18 at opposite ends is provided with the saw toothed portions 30 and 31 which cooperate with the central smooth portion of the cutting edge for slicing soft vegetables, for example tomatoes 32. During this operation, the cutting edge 18 and saw toothed portions 31 and 30 thereof are reciprocated in the direction of the arrows of Figure 3 to penetrate the tomato 32 and to cut the same into the slices 33. The ridge 22 (Figure 7) serves to separate the cut portion of the tomato slice from the body portion thereof to facilitate the cutting operation. This combined sawing and cutting operation is, of course, equally applicable to other soft vegetables and the like.

As shown in Figure 8, the device may then be employed as a server with the slices 33 being supported on the upper face of the operating head along the surface 21 thereof.

Finally, as shown in Figure 9, the device may be employed as a fork by piercing the peripheral portion of the slices with the fork elements 26 and 27, substantially as illustrated. It will be noted that the enlarged ends 28 and 29 serve to prevent the outward displacement of the slices from the elements 26 and 27, respectively, during the use of the device as a fork.

As mentioned, the device is preferably formed by molding of any known type with plastic material having the characteristics of hardness, being odorless, having relative inflexibility, capability of easy cleaning, coloring, inertness to chemicals. Furthermore, the device is of pleasing and artistic appearance. In addition, the functions of the device stem from cooperating structure.

I wish it understood that minor changes and variations in the material, integration, size, manner of production and combination of parts may all be resorted to without departing from the spirit of the invention and the scope of the appended claims.

I claim:

An all-purpose utensil comprising a substantially flat and curved operating end, a handle connected to said operating end, one face of said operating end being formed with a raised curved ridge tapering downwardly and outwardly in opposite directions towards the opposite longitudinal edges of said operating end whereby to provide a curved lower cutting edge, said cutting edge having an intermediate cutting blade portion and end saw teeth portions, the reverse face of said operating end being formed with a curved raised ridge having opposite tapered faces merging with the plane of said reverse face, said tapered face adjacent said cutting edge being tapered more gradually than the other of said tapered faces whereby to separate slices of a vegetable or the like upon downward penetration of said cutting edge into the body portion of the vegetable, said utensil being mold-formed from plastic.

References Cited in the file of this patent

UNITED STATES PATENTS

| | | |
|---|---|---|
| D. 28,186 | Barden | Jan. 18, 1898 |
| D. 60,589 | Thomas | Mar. 7, 1922 |
| D. 162,277 | Berger et al. | Apr. 10, 1951 |
| 164,880 | Shelton | June 22, 1875 |
| 2,279,833 | Madan | Apr. 14, 1942 |

FOREIGN PATENTS

| | | |
|---|---|---|
| 251,959 | Switzerland | Sept. 1, 1948 |